(12) United States Patent
Suh et al.

(10) Patent No.: US 6,984,322 B2
(45) Date of Patent: *Jan. 10, 2006

(54) VOIDED POLYESTER FILM

(75) Inventors: Chang-Ho Suh, Daegu-si (KR); Ki-Bong Suh, Kumi-si (KR); Sang-Pil Kim, Kumi-si (KR)

(73) Assignee: Toray Saehan, Inc., Kyungasangbuk-Do (KR)

( * ) Notice: Subject to any disclaimer, the term of this patent is extended or adjusted under 35 U.S.C. 154(b) by 204 days.

This patent is subject to a terminal disclaimer.

(21) Appl. No.: 10/411,310

(22) Filed: Apr. 11, 2003

(65) Prior Publication Data

US 2004/0178139 A1  Sep. 16, 2004

(30) Foreign Application Priority Data

Mar. 12, 2003  (KR) ..................... 10-2003-0015401

(51) Int. Cl.
*B01D 39/00* (2006.01)

(52) U.S. Cl. ............................. 210/502.1; 210/500.27; 210/488; 210/490; 428/141; 428/317.9; 428/304.4; 428/318.4; 428/319.1; 428/319.3

(58) Field of Classification Search ........... 210/500.27, 210/502.1, 488, 490; 525/92; 428/141, 428/317.9, 304.4, 318.4, 319.1, 319.3

See application file for complete search history.

(56) References Cited

U.S. PATENT DOCUMENTS 3,928,697 A * 12/1975 Mallinson et al. .......... 428/142
6,709,731 B2 * 3/2004 Murschall et al. .......... 428/141
2001/0031802 A1 * 10/2001 Murschall et al. ............. 524/1

FOREIGN PATENT DOCUMENTS

WO    WO 200160900 A1 * 8/2001

OTHER PUBLICATIONS

Ullmann's Encyclopedia of Industrial Chemistry, VCH, D-6940 Weinheim, vol. A11, (1988).*

* cited by examiner

*Primary Examiner*—W. L. Walker
*Assistant Examiner*—K S Menon
(74) *Attorney, Agent, or Firm*—Arent Fox, PLLC

(57) ABSTRACT

The present invention relates to a biaxially stretched, laminated, white microporous polyester film, which can be used in a wide range of industrial applications including printing, imaging, advertising and display. The film of the present invention comprises a porous polyester resin layer B containing a thermoplastic resin non-compatible with polyester; a polyester resin-based photic layer A formed on one surface of the resin layer B, the photic layer A having a 60-degree gloss of the surface thereof of more than 100%; and an aphotic layer C formed on the other surface of the resin layer B, the aphotic layer C having a 60-degree gloss of the surface thereof of less than 50%. The total density of the photic layer A and the aphotic layer C is 0.55–1.2 $g/cm^3$. This film has excellent gloss and flexibility so that it is very suitable for use in printing and imaging.

11 Claims, No Drawings

VOIDED POLYESTER FILM

BACKGROUND OF THE INVENTION

1. Field of the Invention

The present invention relates in general to a biaxially stretched polyester film, and more particularly to a biaxially stretched, laminated microporous polyester film, which is non-transparent and has excellent flexibility so that it can be used in various applications, including printing, imaging, advertising and display.

2. Background of the Related Art

Polyester, mainly polyethylene terephthalate, has excellent physical and chemical properties, and hence, is widely used for polymer-processed products. Particularly, in view of development for use as a film, a porous polyethylene film is actively developed for use as substitutes for labels, cards, white boards, photo papers, imaging papers, and the like. A synthetic resin-based synthetic paper has excellent water resistance, hygroscopicity, dimensional stability and surface smoothness, as compared to a natural paper, and when printed, exhibits excellent gloss, sharpness and mechanical strength. As a white film for the synthetic paper, there is mainly used a polyolefin-based film, which is based on an olefin resin, contains an inorganic filler and a small amount of additives and includes a great number of micropores formed by biaxial stretching. Also, as the white film, there is mainly used a polyester-based film, which has a thermoplastic resin added to a polyester resin non-compatible with the thermoplastic resin and contains a great number of micropores formed by biaxial stretching.

There is well known a method for producing a microporous polyester film, wherein a thermoplastic resin non-compatible with a polyester resin is filled in a matrix at a suitable amount, and micropores are formed by a stretching mechanism. Examples of the thermoplastic resin used in this method include polyolefins, polystyrenes and the like. For example, GB Patent No. 1195153 discloses a method for producing a biaxially stretched film, in which 0.01–5% by weight of polyamide or polypropylene is added to polyethylene terephthalate. Moreover, U.S. Pat. No. 3,579,609 discloses a biaxially stretched film, which is based on polyethylene terephthalate and contains less than 40% by weight of a polymer material selected from a polyolefin polymer, such as polyethylene, polypropylene, polybutylene, polymethylpentene and the like, an ethylene vinyl acetate copolymer and polytetramethylene oxide. Furthermore, U.S. Pat. No. 3,640,994 discloses a biaxially stretched film, which is based on polyethylene terephthalate and contains 1–30% by weight of a polymer, such as polysulfone, polymethylpentene and the like, and 0.2–3% by weight of a light absorber. In addition, U.S. Pat. No. 3,944,699 discloses a biaxially stretched film, which contains 3–27% by weight of polyethylene or polypropylene added to polyethylene terephthalate.

GB Patent No. 1563591 discloses a polyester film, which contains 5–50% by weight of barium sulfate with an average particle size of 0.5–10 µm and also polyethylene as a foaming accelerator dispersed therein. EP 0044616, U.S. Pat. No. 4,368,295 and Japanese Patent Application Laid-Open No. Sho 64-02141 disclose a biaxially stretched, non-transparent or semi-transparent film comprising 0.5–100% by weight of at least one polyester resin, 0.05–50% by weight of at least one polyolefin resin, and at least one carboxylated polyolefin resin. U.S. Pat. No. 4,770,931 discloses a shaped article comprising a continuous polyester phase having dispersed therein microbeads of cellulose acetate which are at least partially bordered by void space. In the shaped article disclosed in this patent, the microbeads of cellulose acetate are present in an amount of about 10–30% by weight based on the weight of said polyester, the void space occupies about 2–50% by volume of the shaped article, the polyester has an I.V. of at least 0.55, the cellulose acetate has an acetyl content of about 28–44.8% by weight and a viscosity of about 0.01–90 seconds, and the microbeads has an average diameter of about 0.1–50 microns.

Korean Patent Publication No. 1994-0011167 and Japanese Patent Application Laid-Open No. 64-18631 disclose a monoaxially or biaxially stretched microshell polyester film with an apparent specific gravity of 0.4–1.3 and a hiding power of more than 0.2, which has a coating layer at one or both surfaces thereof. This coating layer contains at least one compound selected from an organic solvent-soluble thermoplastic polyester resin, an water-dispersible, sulfonated thermoplastic polyester resin, an alkyd polyester resin, acrylic-modified polyester resin, an organic solvent-soluble or water-dispersible vinyl resin, a polyisocynate compound, a blocked polyurethane resin, an epoxy resin, a silicon resin, a melamine resin and the like.

Korean Patent Publication No. 1996-0004143 discloses a porous polyester film with a porosity of less than 4% at a portion up to 3 µm in a thickness direction from the film surface and also an average porosity of 8–50% by volume. Moreover, Korean Patent Publication No. 2000-0023359 discloses a laminated microporous polyester film comprising a microporous polyester layer A with a density of 0.5–1.2 g/cm$^3$, and at least one polyester layer B laminated on at least one surface of the microporous polyester film A, in which the polyester layer B contains white inorganic particles of 0.05–0.44 g/m$^2$ and has a density of more than 1.1 g/cm$^3$, which is at least 0.1 g/cm$^3$ higher than that of the layer A. Furthermore, Korean Patent Publication No. 2000-0025195 discloses a white porous polyester film containing 60% by weight of ethylene terephthalate as a polyester resin, 5–35% by of a polyolefin resin with a melt index of 1.0–25 g/10 minutes, and 0.1–2.5% by weight of a non-ionic antistatic agent. Korean Patent Publication No. 2000-0027216 discloses an at least monoaxially stretched, multilayered, white porous polyester film for use as a substitute for paper, which comprises an intermediate layer B made of an inorganic microparticle-containing resin layer comprising a resin mixture of 65–95% by weight of a polyester resin and 5–35% by weight of a polyolefin resin, and an elastomeric copolymer added at the amount of 0.3–2% by weight relative to the total weight of the resin mixture; and a surface layer A made of an inorganic microparticle-containing polyester resin layer, which is laminated on at least one surface of the intermediate layer B.

Recently, an inkjet printing method is rapidly applied to various devices including facsimiles, printers and plotters because of low noise, the possibility of high-speed recording, the easiness of full-color recording and particularly, low cost. Meanwhile, with high-speed and full-color trends of recording, there is also a requirement for a high-quality property in a recording sheet. For example, in order to increase the sharpness of printed images, even in the case of using synthetic paper or plastic film as the recording sheet, requirements for the hue b value and surface gloss of the recording sheet are often examined unlike the past.

SUMMARY OF THE INVENTION

The present invention is directed to a high-functional white film for use in printing, imaging, advertising, display and the like. For such graphic uses, a surface property of the white film is of importance. In other words, preference and quality of a product varies greatly depending on surface color and gloss of the product. The gloss of the product varies depending on physical properties of the film or surface design of a substrate, and the surface property is fixed by artificially controlling surface roughness of the substrate. The gloss of the substrate greatly affects a post-process, such as printing, and also the quality of the product. Accordingly, an object of the present invention is to provide a multi- and high-functional white film, which can be hereinafter used in various products, including electrical and electronic materials.

To achieve the above object, the present invention provides a biaxially stretched, microporous polyester film, which comprises: a porous polyester resin layer B containing 3–30% by weight of a non-compatible thermoplastic resin with a melt index of 2–20 g/minute; a polyester resin-based photic layer A formed on one surface of the resin layer B, the photic layer A having a 60-degree gloss of the surface thereof of more than 100%; and an aphotic layer C formed on the other surface of the resin layer B, the aphotic layer C having a 60-degree gloss of the surface thereof of less than 50%, the total density of the photic layer A and the aphotic layer C being 0.55–1.25 g/cm$^3$.

DETAILED DESCRIPTION OF THE PREFERRED EMBODIMENT

The production of the three-layered white polyester film according to the present invention can be achieved using a co-extrusion technique based on a technique for the production of a mono-layered white polyester film. The technique for the production of the white film requires an advanced process technique in addition to a technique for the production of a general polyester film. In particular, since a wide polyester production line is generalized nowadays, the development of process technology must be first achieved in order to produce a white polyester film filled with large amounts of inorganic particles. Since large amounts of the filled titanium dioxides cause a reduction in intrinsic viscosity of a polyester matrix, the intrinsic viscosity of the polyester matrix must be maintained at a suitable level. If the matrix viscosity is too low, the possibility of causing film breakage upon film production will be increased. Since large amounts of the inorganic particles act as a nucleating agent of a polymer melt during a casting process, a crystallization-controlling technique is required. Furthermore, these particles cause restriction of matrix stretchability, so that a stretching mechanism different from the conventional polyester film is required.

Silica particles used in the photic layer according to the present invention is preferably an average particle size of 0.5–5 $\mu$m. If the particle size is less than 0.5 $\mu$m, a reduction in dispersibility of the particles in a film will be caused due to cohesion of the particles. If the particle size is more than 5 $\mu$m, the interaction force between particle-particle and particle-matrix will be decreased so that pore production upon a stretching process will be increased, thereby causing unstability of the process. Furthermore, it is preferred that the photic layer A contains 0.005–0.5% by weight of silica particles with an average particle size of 0.5–5 $\mu$m and has a thickness of 1–10 $\mu$m. If the content of the silica particles is less than 0.005% by weight, whiteness of the film will be reduced and hiding force of the film will not reach a suitable value. If the content of the silica particles is more than 0.5% by weight, a change in flow property of the polymer (e.g., a reduction in swelling phenomenon of the melt, and an increase in sagging phenomenon of a melt) and a reduction in stretchability of the film will be caused so that a difficult in a film-forming process will be caused. Meanwhile, the polyester resin layer B contains 5–30% by weight of inorganic particles with an average particle size of 0.1–10 $\mu$m, and 0.005–0.5% by weight of a bisbenzoxazole-based fluorescent whitening agent.

Preferably, the bisbenzoxazole-based fluorescent whitening agent used in the resin layer B is 2,2'-(1,2-ethenediyldi-4,1-phenylene)bisbenzoxazole, and added at the amount of 0.005–0.5% by weight and preferably 0.05–0.2% by weight. If the content of the whitening agent is less than 0.005% by weight, its whitening effect will be decreased, whereas if the content of the whitening agent is more than 0.5%, it will cause a reduction in whiteness of the film due to excessive reflectivity. The inorganic particles used in the resin layer B is one or more selected from the group consisting of titanium dioxide, calcium carbonate, silica, kaolin, mica, talc and barium sulfate.

In the present invention, in order to adjust surface characteristics of the film, surface roughness of the film is inputted using a co-extrusion technique and an inorganic particle design technique, thereby achieving the desired gloss level. In the present invention using materials of different rheological properties, various problems including extrusion instability can be solved by understanding the flow mechanism of each of the materials.

Furthermore, in the film of the present invention, the aphotic layer C contains 0.5–10% by weight of silica particles with an average particle size of 1–20 $\mu$m, and preferably 1–10 $\mu$m. If each of the photic layer A and the aphotic layer C has a thickness of more than 10 $\mu$m, the flexibility of the surface of the laminated film will be damaged. If it has a thickness of less than 1 $\mu$m, surface gloss of the film will be decreased and a difficulty in layer control will be caused.

If the silica particles have average particle sizes of less than 0.5 $\mu$m for the photic layer A and less than 1 $\mu$m for the aphotic layer C even at contents of more than 0.5% by weight and 10% by weight, respectively, or if their contents are less than 0.005% by weight for the photic layer A and less than 0.5% by weight for the aphotic layer C even at average particle sizes of more than 5 $\mu$m and more than 20 $\mu$m, respectively, it will be difficult to achieve the sufficient extinction and printability of the film. On the other hand, if relatively large-sized silica particles with an average particle size of more than 20 $\mu$m are added at large amounts, a film-forming property will be reduced.

Meanwhile, gloss, which is one of principal properties of the biaxially stretched polyester film; is optically determined in evaluating an appearance of the film surface, and depends on the ability of the surface to reflect straight light. The gloss is sensed by the human eye and thus subjective. Accordingly, the difference between visually observed properties needs to be defined as an objective value by instrumental analysis.

Namely, the ratio of the intensity of reflected light to the intensity of incident light can be measured at a certain angle. More specifically, it is determined as functions of the refractive index of surface, the angle of incident light and the surface roughness. If the reflective surface is flat, the reflected light intensity can be predicted from a Fresnel equation at the given incident angle of light. For example, when the refractive index is constant, an increase in the incident angle shows an increase in the ratio of the reflected light intensity to the incident light intensity. Generally, in gloss measurement, there is conducted the comparison of the gloss value of a flat plate having a known refractive index to the gloss value of a material to be measured. Accordingly, the gloss is expressed as the ratio of the reflected light intensity to the incident light intensity of the material to be measured to the reference gloss. In the film, the gloss difference between a stretching direction and a direction perpendicular to the stretching direction occurs due to a difference in a stretching mechanism. This gloss difference is reduced as the content of the particles is increased. It is assumed that, as the content of the particles is increased, the degree of stretching is controlled so that the difference in refractive index is reduced. Also, it is believed that, as the content of the particles is increased, the gloss greatly depends on an extinction effect caused by the particles and voids within the matrix over an extinction effect caused by the surface roughness, so that the gloss difference caused by the difference in surface roughness is offset. As the film thickness is increased at the same particle content, the light scattering ability of the particles within the polymer matrix is increased so that the gloss is somewhat reduced.

As important physical properties of the film measured in the present invention, 60-degree gloss was measured according to ASTM D 523, and density was measured according to ASTM D 1505.

The present invention will hereinafter be described in further detail by examples and comparative examples. It should however be borne in mind that the present invention is not limited to or by the examples.

EXAMPLE 1

The raw material $PM_1$ used in this example is polyethylene terephthalate containing no particles and having an intrinsic viscosity of 0.65 dl/g. The raw material $PM_2$ is polypropylene containing no particles and having a melt index of 10 g/minute. The raw material $PM_3$ is polyethylene terephthalate containing 50% by weight of titanium dioxide with an average particle size of 0.3 μm and 0.15% by weight of a fluorescent whitening agent (OB-1). The raw material $PM_4$ is polyethylene terephthalate containing 5.0% by weight of silicon dioxide with an average particle size of 4 μm. The raw material $PM_5$ is polyethylene terephthalate containing 1% by weight of silicon dioxide with an average particle size of 2 μm. The raw materials $PM_1$, $PM_2$, $PM_3$, $PM_4$ and $PM_5$ were mixed and dried at the weight ratio indicated in Table 1, laminated in the form of a three-layered structure in a feed block, extruded through a co-extrusion die, and cooled in a casting drum, thereby producing a sheet.

The produced sheet was 3.0-fold stretched in the longitudinal direction at a temperature of 75–130° C., and then 3.3-fold stretched in the transverse direction at a temperature of 90–145° C., after which it was thermally treated at a temperature of 215–235° C., thereby obtaining a film having an average thickness of 50 μm. In the produced film, the thickness of each of the layers A, B and C was 3 μm, 44 μm and 3 μm, respectively.

TABLE 1

| | Layers | Layer thickness (μm) | $PM_1$ | $PM_2$ | $PM_3$ | $PM_4$ | $PM_5$ | Remarks |
|---|---|---|---|---|---|---|---|---|
| Example 1 | A | 3 | 90 | 0 | 0 | 0 | 10 | Laminated |
| | B | 44 | 75 | 10 | 15 | 0 | 0 | |
| | C | 3 | 55 | 0 | 0 | 45 | 0 | |
| Example 2 | A | 5 | 90 | 0 | 0 | 0 | 10 | Laminated |
| | B | 40 | 75 | 10 | 15 | 0 | 0 | |
| | C | 5 | 55 | 0 | 0 | 45 | 0 | |
| Example 3 | A | 3 | 90 | 0 | 0 | 0 | 10 | Laminated |
| | B | 44 | 75 | 10 | 15 | 0 | 0 | |
| | C | 3 | 35 | 0 | 0 | 65 | 0 | |
| Example 4 | A | 5 | 90 | 0 | 0 | 0 | 10 | Laminated |
| | B | 40 | 75 | 10 | 15 | 0 | 0 | |
| | C | 5 | 35 | 0 | 0 | 65 | 0 | |
| Comparative Example | — | 50 | 60 | 0 | 30 | 0 | 10 | Laminated |
| Comparative Example | — | 50 | 60 | 0 | 30 | 10 | 0 | Laminated |

EXAMPLE 2

The raw materials $PM_1$, $PM_2$, $PM_3$, $PM_4$ and $PM_5$ were mixed and dried at the weight ratio indicated in Table 1, and then treated in the same manner as described in Example 1, thereby obtaining a film having an average thickness of 50 μm. In the produced film, the thickness of each of the layers A, B and C was 5 μm, 40 μm and 5 μm, respectively.

EXAMPLE 3

The raw materials $PM_1$, $PM_2$, $PM_3$, $PM_4$ and $PM_5$ were mixed and dried at the weight ratio indicated in Table 1, and then treated in the same manner as described in Example 1, thereby obtaining a film having an average thickness of 50 μm. In the produced film, the thickness of each of the layers A, B and C was 3 μm, 44 μm and 3 μm, respectively.

EXAMPLE 4

The raw materials $PM_1$, $PM_2$, $PM_3$, $PM_4$ and $PM_5$ were mixed and dried at the weight ratio indicated in Table 1, and then treated in the same manner as described in Example 1, thereby obtaining a film having an average thickness of 50 μm. In the produced film, the thickness of each of the layers A, B and C was 5 μm, 40 μm and 5 μm, respectively.

COMPARATIVE EXAMPLE 1

The raw material $PM_1$ used in this comparative example is polyethylene terephthalate containing no particles and having an intrinsic viscosity of 0.65 dl/g. The raw material $PM_2$ is polypropylene containing no particles and having a melt index of 10 g/minute. The raw material $PM_3$ is polyethylene terephthalate containing 50% by weight of titanium dioxide with an average particle size of 0.3 μm and 0.15% by weight of a fluorescent whitening agent (OB-1). The raw material $PM_4$ is polyethylene terephthalate containing 5.0% by weight of silicon dioxide with an average particle size of 4 μm. The raw material $PM_5$ is polyethylene terephthalate containing 1% by weight of silicon dioxide with an average particle size of 2 μm. The raw materials $PM_1$, $PM_2$, $PM_3$, $PM_4$ and $PM_5$ were mixed and dried at the weight ratio indicated in Table 1, extruded in the form of a single layer structure, and cooled in a casting drum, thereby producing a sheet.

The produced sheet was 3.0-fold stretched in the longitudinal direction at a temperature of 75–130° C., and then 3.3-fold stretched in the transverse direction at a temperature of 90–145° C., after which it was thermally treated at a temperature of 215–235° C., thereby obtaining a film having an average thickness of 50 μm.

COMPARATIVE EXAMPLE 2

The raw materials $PM_1$, $PM_2$ and $PM_3$ were mixed and dried at the weight ratio indicated in Table 1 above, and then treated in the same manner as described in Example 1, thereby obtaining a film having an average thickness of 50 μm.

Table 3 below shows the kind and contents of particles, the content of additives, and the gloss and density of the films produced according to Examples of the present invention and Comparative Examples. Table 4 below shows the results of ink adhesion tests conducted on the films produced according to Examples of the present invention and Comparative Examples.

As apparent from the foregoing, the microporous polyester film according to the present invention is beautiful and has excellent gloss and flexibility, and the surface thereof is non-rough and uniform. Thus, the polyester film of the present invention is very suitable for use in printing and imaging, so that it has great industrial value.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A microporous polyester film, which comprises:
a porous polyester resin layer B containing polypropylene resin with polyester; a polyester resin-based photic layer A formed on one surface of the resin layer B, the photic layer A having a 60-degree gloss of the surface thereof of more than 100%; and an aphotic layer C formed on the other surface of the resin layer B, the aphotic layer C having a 60-degree gloss of the surface thereof of less than 50%.

2. The microporous polyester film of claim 1, wherein the total density of the photic layer A and the aphotic layer C is 0.55–1.2 $g/cm^3$.

3. The microporous polyester film of claim 1, wherein the polyester resin layer B contains 3–30% by weight of a polyolefin-or polystyrene-based, non-compatible thermoplastic resin with a melt index of 2–20 g/minute.

4. The microporous polyester film of claim 1, wherein the photic layer A contains 0.005–0.5% by weight of silica particles with an average particle size of 0.5–5 μm.

5. The microporous polyester film of claim 4, wherein the photic layer A has a thickness of 1–10 μm.

6. The microporous polyester film of claim 1, wherein the polyester resin layer B contains 5–30% by weight of inorganic particles with an average particle size of 0.1–10 μm.

7. The microporous polyester film of claim 1, wherein the polyester resin layer B contains 0.005–0.5% by weight of a fluorescent whitening agent.

TABLE 2

| | Layers | Layer thickness (μm) | Titanium dioxide content (wt %) | 4 μm silica content (wt %) | 2 μm silica content (wt %) | Polypropylene content (wt %) | Gloss (%) | Density (g/cm³) |
|---|---|---|---|---|---|---|---|---|
| Example 1 | A | 3 | 0 | 0 | 0.1 | 0 | 132 | 0.95 |
| | B | 44 | 5 | 0 | 0 | 15 | — | |
| | C | 3 | 0 | 2.25 | 0 | 0 | 399 | |
| Example 2 | A | 5 | 0 | 0 | 0.1 | 0 | 127 | 1.02 |
| | B | 40 | 5 | 0 | 0 | 15 | — | |
| | C | 5 | 0 | 2.25 | 0 | 0 | 28 | |
| Example 3 | A | 3 | 0 | 0 | 0.1 | 0 | 134 | 0.97 |
| | B | 44 | 5 | 0 | 0 | 15 | — | |
| | C | 3 | 0 | 3.25 | 0 | 0 | 22 | |
| Example 4 | A | 5 | 0 | 0 | 0.1 | 0 | 136 | 1.05 |
| | B | 40 | 5 | 0 | 0 | 15 | — | |
| | C | 5 | 0 | 3.25 | 0 | 0 | 18 | |
| Comparative Example 1 | — | — | 15 | 0 | 0.1 | 0 | 73 | 1.45 |
| Comparative Example 2 | — | — | 15 | 0.5 | 0 | 0 | 43 | 1.45 |

8. The microporous polyester film of claim 6, wherein the inorganic particles are one or more selected from titanium dioxide, calcium carbonate, silica, kaolin, mica, and talc barium sulfate.

9. The microporous polyester film of claim 7, wherein the fluorescent whitening agent is a bisbenzoxazole-based whitening agent.

10. The microporous polyester film of claim 1, wherein the aphotic layer C contains 0.5–10% by weight of silica particles with an average particle size of 1–20 μm.

11. The microporous polyester film of claim 10, wherein the aphotic layer C has a thickness of 1–10 μm.

* * * * *